Nov. 13, 1928.
E. J. VON PEIN
1,691,416
CASH REGISTER
Filed Oct. 3, 1919     5 Sheets-Sheet 1
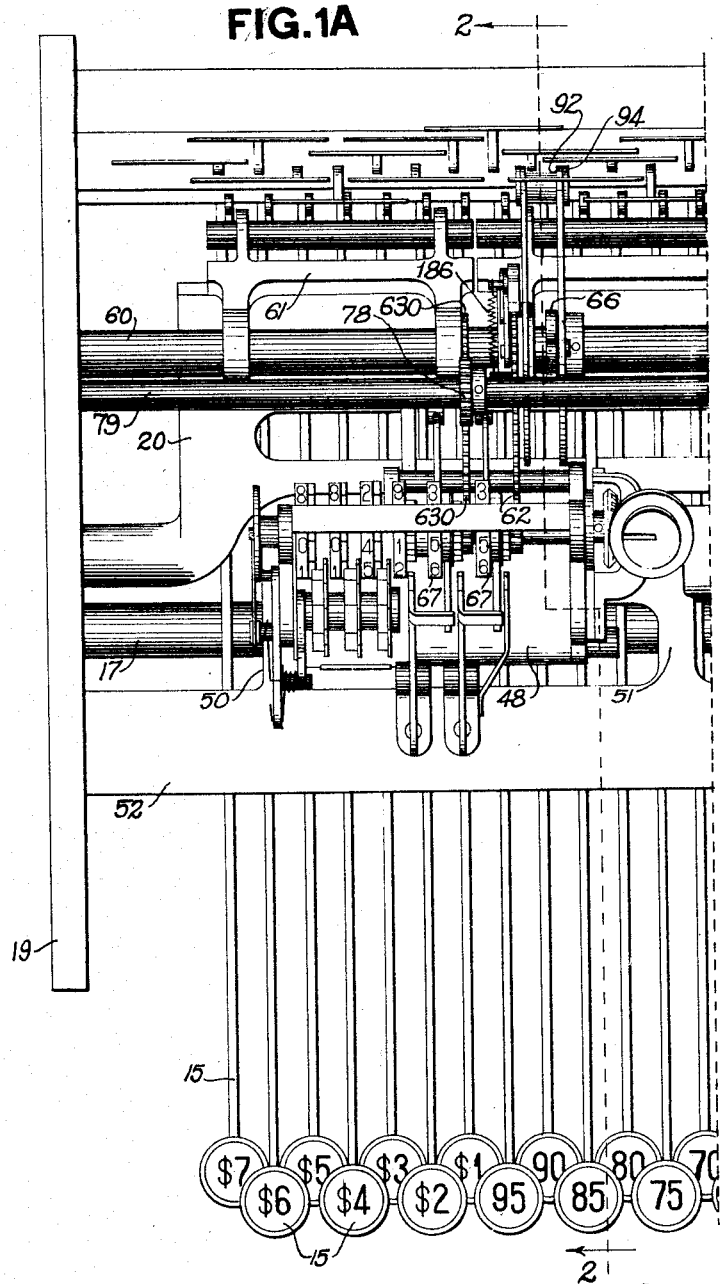
Inventor
EDWARD J. VON PEIN
by Carl Benst
Henry A. Stauffer.
Attorneys Nov. 13, 1928.
E. J. VON PEIN
1,691,416
CASH REGISTER
Filed Oct. 3, 1919       5 Sheets-Sheet 3
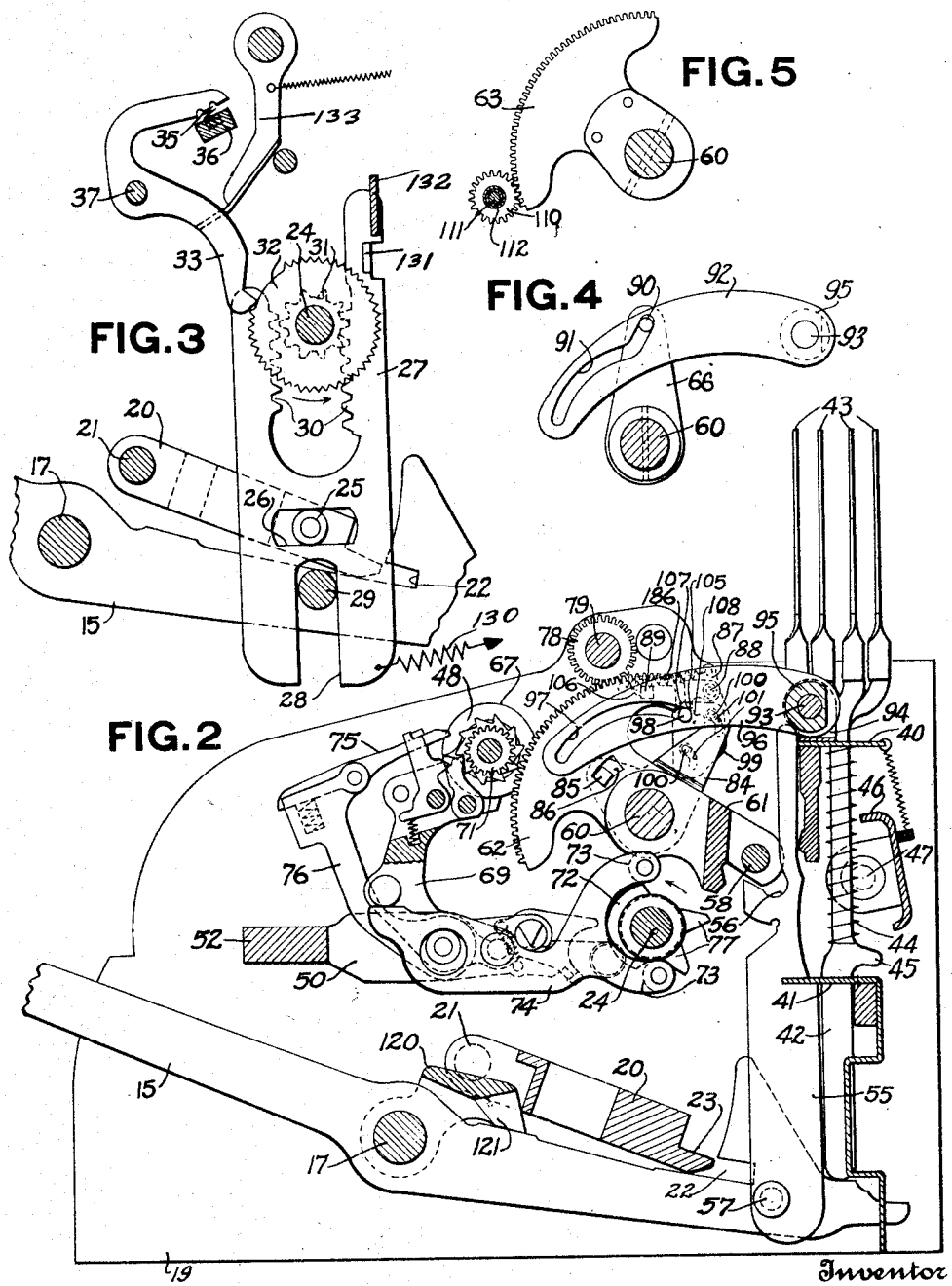
Inventor
EDWARD J. VON PEIN
by Earl Beust
Henry E. Stauffer
Attorneys Nov. 13, 1928.  E. J. VON PEIN  1,691,416
CASH REGISTER
Filed Oct. 3, 1919   5 Sheets-Sheet 4

Inventor
EDWARD J. VON PEIN

Nov. 13, 1928.

E. J. VON PEIN

CASH REGISTER

Filed Oct. 3, 1919

Inventor
EDWARD J. VON PEIN
BY
Carl Beust
Henry C. Stauffer
Attorneys

Patented Nov. 13, 1928.

1,691,416

UNITED STATES PATENT OFFICE.

EDWARD J. VON PEIN, OF DAYTON, OHIO, ASSIGNOR, BY MESNE ASSIGNMENTS, TO THE NATIONAL CASH REGISTER COMPANY, OF DAYTON, OHIO, A CORPORATION OF MARYLAND.

CASH REGISTER.

Application filed October 3, 1919. Serial No. 328,127.

This invention relates to improvements in cash registers and has more particular relation to the type of cash registers shown and described in Letters Patent of the United States, issued to Thomas Carney, May 23, 1893, No. 497,860, and also in the United States Letters Patent to Joseph P. Cleal, No. 718,565, issued January 13, 1903.

The general operation and construction of the machine shown in the present application are substantially like that shown in the Carney and Cleal patents.

The object of the present invention is to enable a proprietor of a store selling taxable goods, to keep an account of the sale of all goods upon which there is placed a Government tax and also to keep an account of the proper tax which is collectable by the revenue department of the Government on the sale of such goods.

For the accomplishment of this object the machine is constructed to enable the proprietor to register simultaneously both the amount of a purchase and the amount of the proper tax to be applied thereto.

It is a further object of the invention to provide not only for the registration of the amount of the purchase and the amount of the tax assessable on the purchase, but also to make a printed record of the amount of the purchase and to indicate said amount.

With these and incidental objects in view, the invention consists in certain novel features of construction and combinations of parts, the essential elements of which are set forth in the appended claims and a preferred form or embodiment of which is hereinafter described with reference to the drawings which accompany and form part of the invention.

Of said drawings:

Figs. 1<sup>A</sup> and 1<sup>B</sup> taken together constitute a top plan view of the machine with the cabinet and certain parts omitted for the sake of clearness.

Fig. 2 is a cross section of the machine taken approximately on the line 2—2 of Fig. 1<sup>A</sup>, looking in the direction of the arrows.

Fig. 3 is a detail sectional view partly broken away of the mechanism for rotating the common operating shaft.

Fig. 4 is a detail view of part of the auxiliary mechanism for actuating the tax totalizer.

Fig. 5 is a detail view of the five cent actuating segment, showing its connection with the type wheel pinion and sleeve.

The machine in general comprises banks of depressible keys representing the amount of the purchase.

Separate totalizers are provided whereby the amount of the tax and the amount of the purchase will be registered separately and simultaneously on their appropriate totalizers.

The usual indicators for this type of machine are provided for all of the keys of the register so as to indicate to the public which of the keys have been operated.

Simultaneously with the registration of the purchase amount in its totalizer, a printing of this amount is effected upon a detail record strip.

Figure 1B:
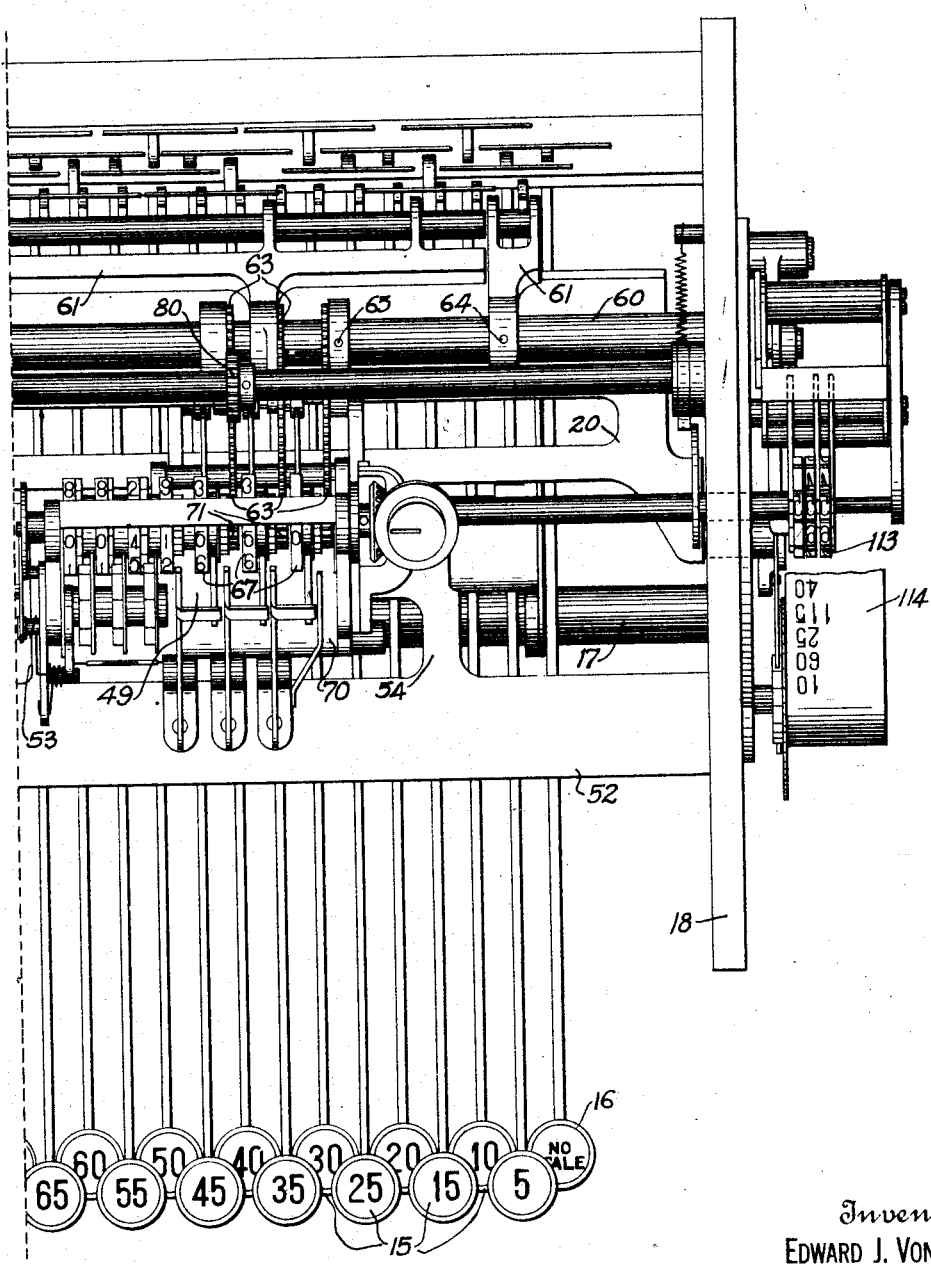

Described in detail the machine comprises a series of amount or purchase keys 15 and a "no sale" key 16. All of the keys 15 and 16 are pivotally mounted upon a transverse rod 17 (Figs. 1<sup>A</sup>, 1<sup>B</sup> and 2) supported in side frames 18 and 19. Common to all of the keys 15 and 16 is a key coupler 20 of a form well known in the art and fully described in the aforesaid Carney and Cleal patents. The key coupler 20 is pivoted at 21 at each end in the side frames 18 and 19, and its rear edge normally rests on the rear ends of the purchase keys 15 and "no sale" key 16. Each of the purchase keys 15 and "no sale" key 16 is provided with a notch 22 (Fig. 2) which is adapted to cooperate with the lip 23 formed on the rear edge of the key coupler 20 when any of the keys 15 and key 16 are depressed.

Suitably mounted in the side frames 18 and 19 is a transverse rotary shaft 24 which is given a complete rotation upon each reciprocation of the key coupler 20 by the mechanism shown in detail in Fig. 3. By referring to said figure, it will be noted that at its right hand end the coupler 20 is provided with a stud 25 which projects into an elongated slot 26 formed in a vertical reciprocable double rack 27. At its lower end, the double rack 27 is provided with an open slot 28 which straddles a stud 29 carried by the right hand side frame 18. At its upper end, the rack 27 is also slotted and the inside walls of the slot are furnished with oppositely faced rack teeth 30 which cooperate with a pinion 31 fast on the rotary shaft 24. In the normal position of the parts the rear rack teeth 30 are held in engagement with the pinion 31 by a spring 130. This relation is maintained during the upward travel of the rack by a guide flange 131 on the rack and a guide flange 132 on the frame of the machine. At the end of the upward travel of the rack as the flange 131 passes beyond the flange 132, a spring pressed pawl 133 rocks the other rack 30 into engagement with the pinion 31 which engagement is maintained during downward travel of the rack by the flanges 131 and 132 as the flange 131 slides down upon the rear surface of the flange 132. This mechanism is substantially the same in construction and operation as the mechanism shown in the aforesaid Carney and Cleal patents for the accomplishment of the same purpose, that is, the giving of a complete rotation to the shaft 24 at each reciprocation of the key coupler 20, the rotation being in the direction of the arrow shown in Figs. 2 and 3.

In order to prevent a retrograde movement of the shaft 24, a ratchet or full-stroke disk 32 is made fast to the right hand end of the shaft 24 and cooperates with a pivoted full stroke pawl or lever 33 pivoted at 37 to the frame of the machine and held in engagement with the ratchet 32 by a spring 35 seated in the lug 36 on the right hand side frame 18.

It will thus be seen that upon each complete depression of a purchase key 15 or a "no sale" key 16, the key coupler 20 will be oscillated and, through the connections shown in Fig. 3 and above described, a complete single rotation will be given to the shaft 24. The function of the key coupler 20, as is well known in the art, is to permit the starting of an operation by two or more keys, for example, the "$1" key and the "20¢" key, and then the completion of the operation by pressing either one of the two keys. By reason of the engagement of the lip 23 of the key coupler with the notches 22 in the keys, 15 both the "$1" key and the "20¢" key will be fully operated by the complete depression of either one of the two keys.

*Indicating mechanism.*

Slidably mounted in the guide plates 40 and 41 just above the rear end of each of the keys 15 and 16, is an indicator rod 42 which carries at its upper end an indicator tablet 43 of a type fully shown and described in the hereinbefore mentioned Carney and Cleal patents. The indicator rods 42 are held in lowermost position by springs 44 so that the lower ends of all of the indicator rods 42 except the one last operated are in contact with the rear ends of the keys 15 and 16. Each of the indicator tablets 43 bears a special character or characters which are preferably identical with the character or characters appearing on the forward ends of their appropriate keys 15 and 16. When any of the keys are depressed, its indicator rod 42 will be elevated against the tension of the spring 44 thereby carrying the corresponding tablet 43 upward until the projection 45 on the indicator rod 42 passes above a rocking bail 46 pivoted at 47 at either end to the side frames 18 and 19. The construction and operation of this bail are old and well known in the art and will not be described in detail here. Its purpose is to hold the indicator rods 42 appropriate to the depressed keys, in elevated position so as to sustain an indication between operations of the machine, thereby showing which keys were depressed in the previous operation. It will thus be seen that when any one of the keys 15 and 16 has been depressed, the proper indicator tablet 43 will be raised and publicly exposed through the sight openings in the cabinet which are commonly provided in cash registers so as to indicate which of the keys 15 and 16 have been operated.

*Totalizers.*

As hereinbefore stated in the early part of the description, the machine is provided with two totalizers 48 and 49. The totalizer 48 (Fig. 1^A) lies at the left hand end of the machine just above the keys. The totalizer 49 lies to the right and above the keys as shown in Fig. 1^B.

The left hand totalizer will hereinafter be known as the "tax" totalizer. The right hand totalizer 49 will be hereinafter called the "purchase" totalizer.

The operations of the two totalizers 48 and 49 are identical with the exception of the operation of the units wheel in the "tax" totalizer.

The "tax" totalizer 48 is pivotally supported by brackets 50 and 51 carried by a forward tie bar 52 constituting part of the frame of the machine. The "purchase" totalizer is supported by brackets 53 and 54 also carried by the tie bar 52.

As the general construction and operation of the "tax" and "purchase" totalizers are identical it is thought that the description with reference to the "purchase" totalizer will be sufficient to enable any one skilled in the art to understand the operation of both totalizers.

Pivotally mounted at 57 (Fig. 2) on each of the keys 15 except the 5¢ key, and on a member movable with the 5¢ key is an upwardly extending thrust member 55 which is formed near its upper end with a notch 56. The notches 56 of the various thrust members are located at different distances from the pivotal points 57 of the members 55, thereby enabling them to impart graduated movements to the registering mechanism of the machine by the operation of the various keys 15.

Referring to Fig. 2, the notch 56 of the thrust member 55 there shown is adapted to engage a cross rod 58 when its corresponding key is depressed. The cross rod 58 is carried by a rocking frame 61 pivotally mounted upon a rock shaft 60 supported in the side frames 18 and 19. A rocking frame 61 is provided for each of the three groups of keys 15, one frame for the units of cents group, one frame for the tens of cents group and a third frame for the dollars group. It will thus be seen that when any one of the keys is depressed, it will rock its appropriate frame 61 different distances according to the location of the notches 56 of their appropriate thrust members 55.

By reference to Figs. 1^A and 1^B, there will be seen the three rocking frames 61 provided, the right hand one in Fig. 1^B being for the purpose of controlling registration of amounts on the units of cents wheel of the totalizer 49. The central frame 61 is for the purpose of controlling the registration of amounts on the tens of cents wheel of totalizer 49. The left hand frame 61 (Fig. 1^A) is for the purpose of controlling registration of amounts upon the units of dollars wheel of the totalizer 49. By referring to the two Figs. 1^A and 1^B, it will be further noted that the key board is divided into three groups of keys, the left hand group comprising dollar keys from one to seven dollars. The second comprises the keys ranging from 10¢ to 95¢, certain of said keys representing multiples of "ten", the remaining ones of the group representing uneven multiples of "five". The third group comprises the single 5¢ key. In the depression of the keys representing the uneven multiples of "five" in the second group, it will readily be seen that it is necessary to provide connections whereby the amount will be entered partially upon the units of cents wheel of the totalizer 49 and partially upon the tens of cents wheel of the totalizer 49. For example, if the 25¢ key is depressed, it should add 5¢ on the units of cents wheel, and 20¢ upon the tens of cents wheel. The 5¢ key will only act to add 5¢ upon the units of cents wheel of totalizer 49.

For the purpose of accomplishing the result of adding on both the units and tens order wheels of the totalizer 49 when a key of the middle group representing the uneven multiples of five is depressed, the following construction is provided. This construction is fully illustrated and described in United States Letters Patent, No. 683,877, granted to Thomas Carney, October 1, 1901, but will be briefly described herein as follows.

Figure 6:
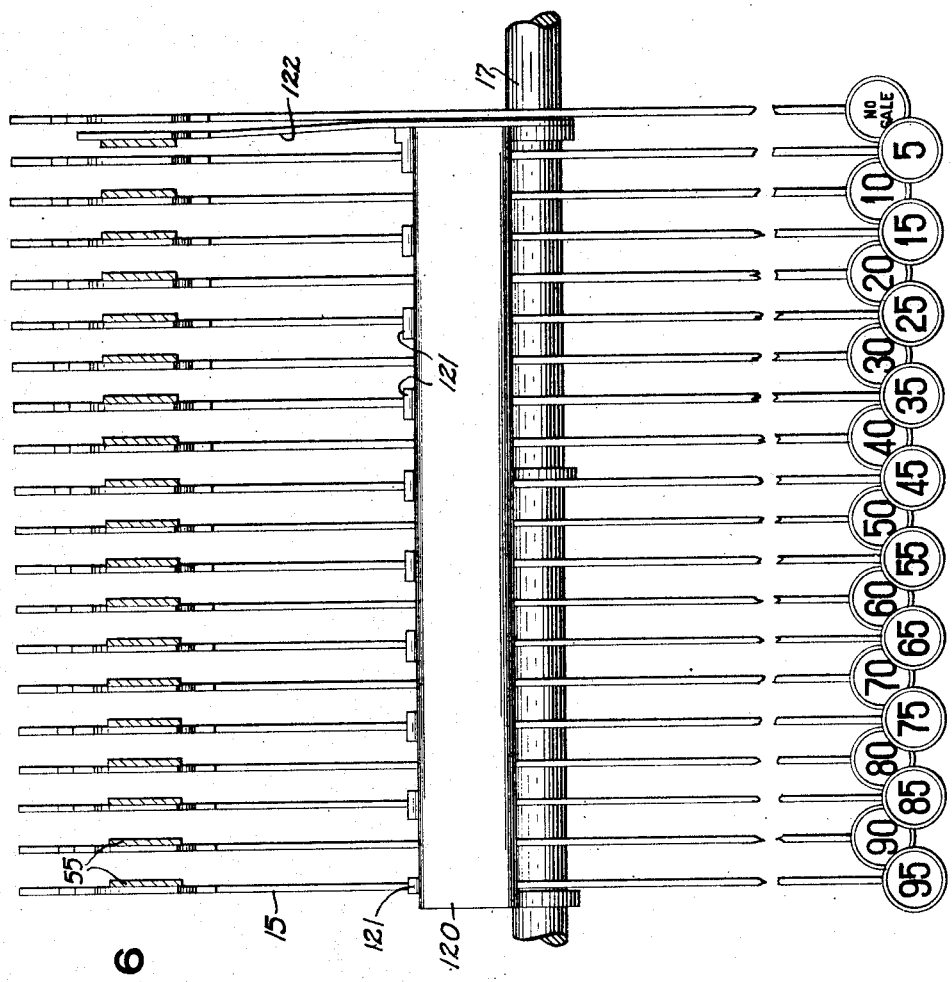
Fig. 6 is a detail plan view of the auxiliary key coupler showing its relation to the keys.
Figure 10:
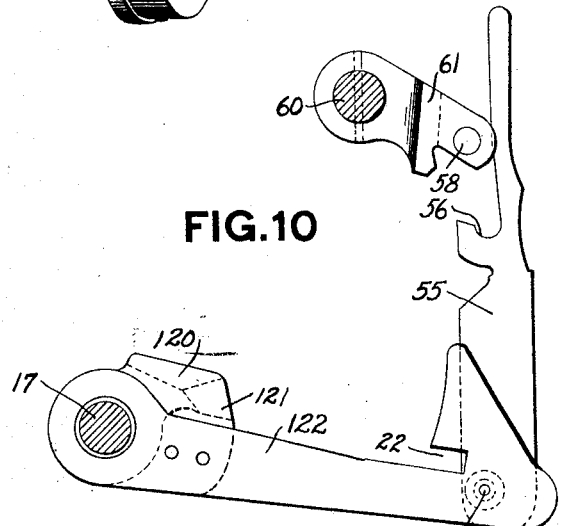
Fig. 10 is a detail side elevation of the key cam for the five cent frame and the means for actuating it.

A bail 120 (Figs. 2 and 6) is pivoted upon the key rod 17, the cross piece of said bail lying just above the two right hand groups of keys 15 to the rear of the key rod 17. The cross piece of the bail 120 is provided with a plurality of downwardly extending lugs 121 which contact, respectively, with the 5¢ key and with all of the keys representing uneven multiples of "five." Fast on the right hand end of the bail 120 is a rearwardly extending arm 122 (Fig. 10) having pivoted near its rear end a vertical thrust member 55 similar to the thrust members 55 above described. The thrust member 55 carried by the arm 122 acts upon the right hand frame 61 to rock that frame in the same manner as the thrust members 55 carried by the keys 15 act upon the other two frames 61. The 5¢ key carries no menber 55. Consequently whenever the 5¢ key is depressed it will only serve to rock the right hand frame 61 through the medium of the bail 120, which, it will be remembered, has a lug 121 contacting with the 5¢ key. When a 15¢ key is depressed, it will, through the member 55 carried by it, rock the middle one of the frames 61 one step so as to add a single unit on the tens of cents wheel of the totalizer 49. As the bail 120 carries a downwardly extending lug 121 contacting with 15¢ key, said bail 120 will also be rocked and consequently, the thrust member 55 carried by the arm 122 of the bail 120 will act to rock the right hand frame 61 a distance of "five" steps so as to add "five" on the units wheel of the totalizer 49. Any key of the middle group representing multiples of "ten" will, in its movement, pass between lugs 121 of the bail 120 and consequently, when one of the keys representing multiples of "ten" is operated, no movement of the bail 120 is effected.

The right hand frame 61 is pinned at 64 to the rock shaft 60, and consequently, any movement of the right hand frame 61 under the control of the 5¢ key, or one of the middle group of keys representing uneven multiples of "five" will be transmitted to the rock shaft 60. Also pinned to the rock shaft 60, as at 65, (Fig. 1^B) is a toothed segment 63 to which is transmitted the rocking movements of the frame 61 through the medium of the rock shaft 60. The middle frame 61 (Figs. 1^A and 1ᴮ) for the middle group of keys 15 is pivoted on the rock shaft 60 and has fast thereto near its right hand end a similar toothed segment 63. The frame 61 appropriate to the dollars key 15 is also loosely mounted upon the rock shaft 60 and has fast on its right hand end a segment 630, operatively connected with another similar segment 63 as hereinafter described.

It will thus be seen that the operation of the "5¢", "dimes" and "dollars" purchase keys 15 will be transmitted to the three segments 63 (Fig. 1ᴮ) through the medium of the appropriate frames 61.

The "purchase" totalizer is substantially identical in construction and operation with the totalizer shown in the Carney and Cleal patents hereinbefore referred to but will be described briefly as follows:

*Purchase totalizer.*

The "purchase" totalizer 49 comprises a plurality of totalizer elements 67 rotatably mounted upon a shaft suitably supported in the rocking totalizer frame 70 Fig. 1ᴮ. The wheels 67 bear on their peripheries stamped numerals. The first wheel on the right has a "0" and the numeral "5" diametrically opposite on said wheel. The other wheels 67 have their numerals running from "1" to "9" and "0" inclusive. In Fig. 1ᴮ it will be noted that the totalizer comprises seven of such wheels 67. The three wheels of lower numerical order, that is, the three wheels to the right in Fig. 1ᴮ, are each fast to a pinion 71, each of which is normally in operative alignment with its respective registering segment gear 63.

Figure 2 is a section showing the "tax" totalizer, and as the construction of the "purchase" and "tax" totalizers in general are identical, this figure will be utilized in further describing the "purchase" totalizer.

Upon the rotation of the main drive shaft 24, a cam 72, rigidly mounted thereon, will cooperate with anti-friction rollers 73 carried by an arm 74 operatively connected to the rocking totalizer frame 70. When the main drive shaft 24 is rotated upon a depression of one of the "purchase" keys 15, the cam 72 is effective to rock the totalizer frame 70 through the medium of the arm 74, to engage the totalizer pinions 71 of the "purchase" totalizer with the registering segments 63 (62 in Fig. 2) before any movement of the registering segments 63 and the rocking frames 61 is begun. This engagement of the pinions 71 with the registering segments 63 is continued throughout the downward movement of the outer ends of the keys 15. At the completion of the downward movement of the outer ends of the keys 15, which is the end of the registering stroke of the keys, the cam 72 will act upon the lever 74 to rock the totalizer frame 70 (69 in Fig. 2) rock the "purchase" totalizer forward and disengage the pinions 71 from the registering segments 63 (62 in Fig. 2). During the return movement of the keys 15, therefore, and a consequent restoring movement of the registering segments 63 (62 in Fig. 2), the pinions 71 will remain disengaged so that the return movement of the segments 63 will have no effect upon the totalizer elements.

Suitable transfer mechanism, comprising the transfer pawls 75 carried by the rocking arms 76, which latter are operated by cams 77 fast on the rotating shaft 24, is provided for performing the function of carrying from the totalizer elements of lower order to the elements of higher order at the proper time in the rotation of the totalizer elements 67. This transfer mechanism is old and well known in the art and is fully described in the hereinbefore mentioned Carney and Cleal patents. It will thus be seen that upon each actuation of one or more of the purchase keys 15 the "purchase" totalizer will be rocked to engage the pinions 71 of the totalizer with the registering segments 63 to enter upon the "purchase" totalizer the amount of the purchase as represented by the keys depressed. Means is also shown for resetting the totalizer wheels to zero by rotating their supporting shaft, but as this is old and well known in the art it will not be described in detail here.

*Tax totalizer.*

The general operation of the "tax" totalizer will be briefly described as follows, it being thought unnecessary to go into the description in detail of the parts that are identical with those parts of the "purchase" totalizer previously described.

The machine is constructed to register an amount on the "tax" totalizer which will be equal to one cent for each 10¢ or fraction thereof of the purchase amount which is registered on the "purchase" totalizer. This result is obtained automatically when pressing any of the purchase keys 15.

Since the amount entered into the "tax" totalizer is one cent for every 10¢ or fraction thereof, entered into the "purchase" totalizer, the first or units wheel of the "tax" totalizer is omitted, thereby converting the right hand wheel, (Fig. 1ᴬ) which in the standard type machine is ordinarily the second or tens wheel, to be the first or units wheel. Said units wheel 67 (Fig. 1ᴬ) is actuated by a segment gear 62 which is journaled upon the hub of frame 61 for the tens keys, (Figs. 7 and 8) and will hereinafter be described.

The second wheel 67, (Fig. 1ᴬ) of the tax totalizer is actuated by the segment gear 630 fast on the left hand or dollars rocking frame 61 operated by the "dollar" keys 15.

Said segment gear 630 also meshes with a pinion 78 pinned to a transverse shaft 79 suitably supported on the side frames 18 and 19. The shaft 79 has fast thereon a pinion 80 (Fig. 1B) which meshes with the registering segment 63 actuating the dollar wheel in the "purchase" totalizer 49, said segment 63 being free on the shaft 60. It can thus be seen that when any of the dollar keys 15 are depressed to rock the frame 61, that motion will be transmitted to the tens wheel in the "tax" totalizer and by said segment 630 shaft 79, and pinions 78 and 80, to the dollar wheel in the "purchase" totalizer. The segment 62 which actuates the units wheel 67 of the "tax" totalizer (Figs. 1A and 2) is rocked by the tens of cents rocking frame 61 through the bell crank lever 84, (Figs. 7, 8 and 9) so that should a 60¢ key be depressed "6" will be registered upon the units wheel of the "tax" totalizer. This segment 62 being freely mounted on the hub of the tens of cents rocking frame 61 is rocked by the bell crank 84 fast to the tens of cents rocking frame 61 (Figs. 1, 2, 7 and 8) and having mounted thereon a pin 85 which engages with a slot 86 in said segment 62 to permit a limited relative movement between the bell crank 84 and the adding segment 62.

The segment 62 is normally held in contact with the lower side of the pin 85 by a spring 186 one end of which is attached to the segment 62, the other end being attached to a latch member 87 pivoted on a stud 88 on the bell crank 84. The hooked end 106 of the latch 87 normally hooks over a stud 89 mounted in the segment 62. By this connection between the freely mounted segment 62 and the bell crank 84, it can be seen that when the rocking frame 61 (Fig. 7) is moved counter-clockwise on its pivot, the shaft 60, by depressing a key 15 (Fig. 2) of the tens of cents group, the segment 62 will be moved in a like direction by the square pin 85 (Fig. 7) engaging the lower end of the slot 86. As the rocking frame is moved clockwise and returned to home position, the hooked end 106 of the latch member 87 engaging the square pin 89 will move the segment 62 clockwise in unison with the rocking frame.

As the tax is one cent on every 10¢ or fraction thereof, it is necessary, when pressing the 5¢ key, to register "one" on the units wheel of the "tax" totalizer. The rock frame 61 which is rocked by the pressing of the 5¢ key, is pinned to the shaft 60. Also pinned to the shaft 60 near the left hand end is a crank 66 (Figs. 4, 8 and 9) which extends upward and carries a pin 90 which projects into a cam slot 91 in an arm 92. This arm 92 is pivoted on a rod 93 mounted in a bracket 94 (Figs. 1A and 2) secured to the framework of the machine. The cam slot 91 in the arm 92 is so formed that, by the rocking of the shaft 60 and its crank 66, the pin 90 in the crank will cause the arm 92 to swing on its pivot 93 in a clockwise direction (Fig. 4).

Pivoted also on the rod 93 (Figs. 2 and 9) and fast to the arm 92 by a hub 95 is an arm 96 which has a curved slot 97 in which travels a pin 98 mounted in a plate 99. This plate 99 is mounted for relative movement on the bell crank 84 by two studs 100 on the bell crank projecting into formed slots 101 in the plate 99.

Figure 7:
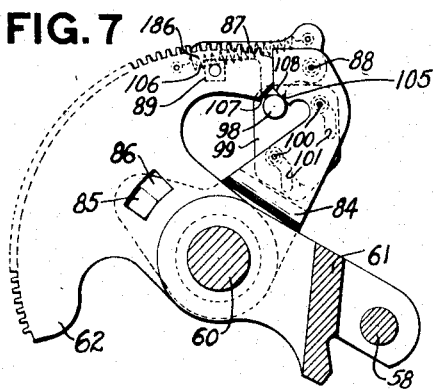
Fig. 7 is a detail side elevation of the units actuating segment of the "tax" totalizer and its operating mechanism.
Figure 8:
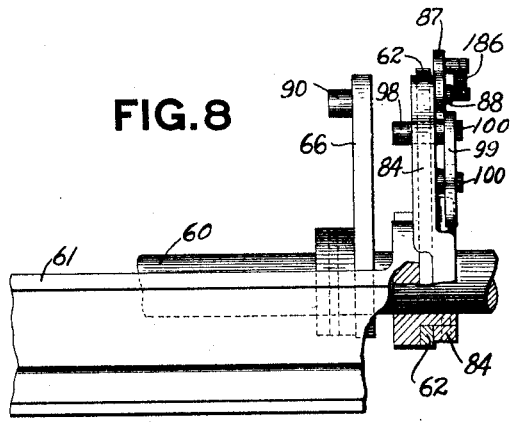
Fig. 8 is a detail end view partly in section of the mechanism shown in Fig. 7, looking toward the left.
Figure 9:
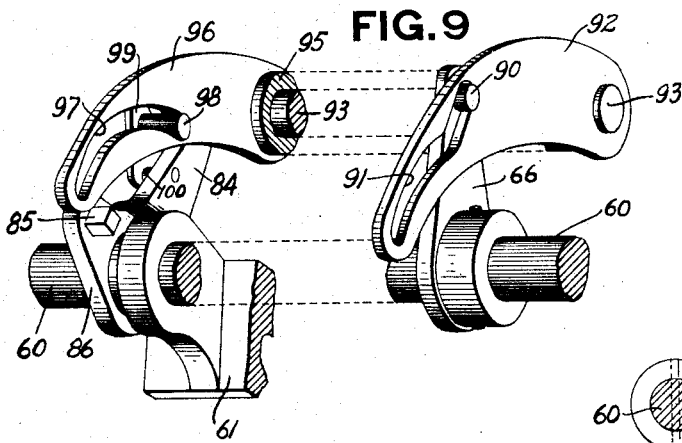
Fig. 9 is a detail perspective view of the mechanism for giving the units actuating segment of the "tax" totalizer an extra step of movement.

The pin 98 which travels in the curved slot 97 of the arm 96 also contacts with a projection 105 (Fig. 7) on the latch 87. The "5¢" key, when depressed, operates through the bail 120, arm 122 (Fig. 10) and thrust member 55 to rock the units frame 61 and shaft 60, as heretofore explained. The crank 66 turns with the shaft 60 and causes its pin 90 to traverse the cam slot 91 in the arm 92 pivoted on rod 93, to rock the arm 92, and with it the companion arm 96 having the curved slot 97 therein. And since the pin 98 on the plate 99 projects into the slot 97, the pin 98 and its plate will be shifted in a general direction, first, upwardly and then downwardly. The latch 87, being in contact with the pin 98, will be swung on its pivot 88 unlatching its forward hooked end 106 from the pin 89 on the adding segment 62, and as the latch 87 releases the pin 89, the pin 98 will have engaged with the angle face 107 formed on the rear end of the segment 62. As the pin 98 continues its upward travel, it contacts an angle face 108 formed on the bell crank 84 which crowds the pin 98 forward in its upward travel against the angle 107 and forces the segment 62 to rock in a counter-clockwise direction against the resistance of the spring 186 until the pin 98 takes a position between the bell crank 84 and the segment 62. The action of said pin 98 thus causes the segment 62 to swing a distance equal to one division on the "tax" totalizer units wheel 67, the "tax" totalizer being in engagement with the segment 62 at the time. It will be seen that the slot 86 in the segment 62 is elongated to permit this one-step movement of the segment 62 relatively to the rocking frame. Should the 25¢ key be depressed the units tax totalizer segment 62 will receive a movement equal to two divisions of the totalizer wheel 67 by the rocking of the tens of cents segment frame 61 in the usual manner, and an additional movement of one division by the rocking of the units segment frame 61 communicated to the units tax totalizer segment 62 by the mechanism shown in Fig. 10, and which has previously been described. The rocking of the shaft 60 operates the mechanism shown in Figs. 7, 8 and 9 provided for entering one in the "tax" totalizer, as described above, when keys representing uneven multiples of five are operated.

It will thus be seen that upon the operation of any one or more of the purchase keys 15, the amount of the tax will be entered on a "tax" totalizer so that the "tax" totalizer will show the total amount of tax appropriate to the purchase amount recorded on the machine.

Printing mechanism.

For the purpose of printing upon the detail record strip to be retained in the machine the amount of the purchase, the movements of the registering segments 63 of the purchase totalizer are transmitted to printing wheels for printing the amount of the purchase. Referring to Fig. 5, each of the registering segments 63 of the "purchase" totalizer meshes with its individual pinion 110, the left hand pinion being fast on a cross shaft 111, while the other two pinions are fast on the left hand ends of nested sleeves 112 supported on the shaft 111. The shaft 111 and sleeves 112 extend to the right (Fig. 1ᴮ) through the side frame 18 and have fast on their right hand ends the printing wheels or elements 113.

Through the connections just above described, the printing elements or wheels 113 will be adjusted during the registering strokes of the keys 15 to positions representing the values of the keys depressed. These values are printed upon the detail record strip 114 which is retained in the machine. As this printer is substantially identical in construction and operation with the printer shown in the Carney and Cleal patents hereinbefore referred to, it will not be described herein in detail.

General operation.

The general operation of the machine, therefore, comprises the following steps.

Supposing the machine to be used in a soda fountain where a tax of "one cent" is to be assessed for each 10¢ of purchase or fraction thereof, and taking as an example, the purchase of a 5¢ soda, the operator will operate the machine as follows: For a 5¢ soda, the tax will be "one cent," consequently the 5¢ key is depressed. The operation of the 5¢ key will properly register 5¢ upon the "purchase" totalizer and "one cent" upon the "tax" totalizer and at the same time, the indicator 43 appropriate to the 5¢ key will be elevated and publicly expose the 5¢ purchase. At the same time, the printing elements 113 will be adjusted to print 5¢ on the detail record strip. Take another sale of 35¢, the 35¢ key will be depressed, at which operation 35¢ will be entered in the "purchase" totalizer, and 4¢ entered in the "tax" totalizer, and 35¢ indicated to the customer and also printed upon the detail record strip.

On a "no sale" transaction, no registration is made on either of the two totalizers, and a printed entry of zeros is made on the detail strip 114.

While the form of mechanism herein shown and described, is admirably adapted to fulfil the objects primarily stated, it is to be understood that it is not intended to confine the invention to the one form or embodiment herein disclosed, for it is susceptible of embodiment in various forms all coming within the scope of the claims which follow.

What is claimed is,—

1. In a machine of the class described, the combination of a plurality of totalizers, a set of actuators for each of said totalizers, means for giving the units actuator of one group at least one step of movement upon every actuation of the units and tens actuators of the other group, and manipulative amount determining means for actuating said last mentioned actuators.

2. In a machine of the class described, the combination of a plurality of totalizers, a group of actuators for each of said totalizers, and driving connections intermediate the units actuator of one group and the units and tens actuator of the other group whereby the former actuator receives an actuation for each actuation of either of the latter actuators.

3. In a machine of the class described, the combination of a plurality of totalizers, a set of actuators for each of said totalizers, operating connections intermediate the tens actuator of one group and the units actuator of the other group, whereby the latter actuator will be actuated by an actuation of the former actuator to like extents, operating connections intermediate the units actuator of the first group, and the units actuator of the second group, whereby the latter actuator will be given an extent of movement independent of the tens actuator of the first group when the units actuator of the first group is actuated.

4. In a machine of the class described, the combination of a plurality of totalizers, a group of actuators for each of said totalizers, operating connections between the units and tens actuator of one group and the units actuator of the other group, whereby the latter actuator will be given certain extents of actuation upon operation of either one of the former actuators and different extents of actuation upon an actuation of both of the former actuators.

5. In a machine of the class described, the combination of a plurality of totalizers, a group of actuators for each of said totalizers, an operating frame intermediate the actuator of one group and an actuator of the other group, whereby said actuators may be actuated to like extents, and means whereby the actuator of one group may be given an actuation independent of said operating frame.

6. In a machine of the class described, the combination of manipulative amount-determining devices, an operating element actuated thereby, an actuator latched to said operating element, and means to unlatch said actuator from the operating element whenever certain manipulative amount-determining devices are operated.

7. In a machine of the class described, the combination of manipulative amount-determining devices, an actuator, a pivoted actuator-operating element latched to said actuator, means wholly carried on said actuator-operating element for unlatching said actuator, and for moving it on its pivot, and means for actuating said unlatching means.

8. In a machine of the class described, the combination of manipulative amount-determining devices, a set of actuator-operating elements, an actuator latched to one of said elements, a member mounted upon said element for unlatching said actuator, and means for operating said member by another actuator-operating element.

9. In a machine of the class described, the combination of manipulative amount-determining devices, an actuator, an actuator-operating element rocked on its pivot by said amount-determining devices, a rocking crank carrying a pin engaging a slot formed in a swinging arm to give a rocking motion to said arm, a second arm fast to said slotted arm and pivoted at the same point, and having a slot engaging with a pin to unlatch and rock the actuator.

10. In a machine of the class described, the combination of a plurality of totalizers, a set of actuators for each of said totalizers, the tens actuator of one set and the units actuator of a second set adapted to receive an actuation to like extents, driving means latched to said units actuator, and means rigid with the units actuator of the other set for unlatching the driving means so as to drive the units actuator of said second set an extra step.

11. In a machine of the class described, the combination of a plurality of totalizers, a set of actuators for each of said totalizers, the tens actuator of one set and the units actuator of a second set adapted to receive an actuation to like extents, driving means latched to said units actuator, and means rigid with the units actuator of the other set and operated when the last-mentioned units actuator is actuated, for unlatching said driving means and independently driving the units actuator of said second set.

12. In a machine of the class described, the combination of a plurality of totalizers, a set of actuators for each of said totalizers, the tens actuator of one set and the units actuator of a second set adapted to receive an actuation to like extents, driving means latched to said units actuator, means rigid with the units actuator of the other set, and a device operated by the last-mentioned means for engaging said driving means and unlatching it, and for independently driving the units actuator of said second set.

13. In a machine of the class described, the combination of a plurality of totalizers, a set of actuators for each of said totalizers, the tens actuator of one set and the units actuator of a second set adapted to receive an actuation to like extents, driving means latched to said units actuator, means rigid with the units actuator of the other set, and a device operated by the last-mentioned means for separating said driving means and the units actuator of said second set, and simultaneously advancing said actuator.

14. In a machine of the class described, the combination of a plurality of totalizers, a group of actuators for each of said totalizers, means for moving the units actuator of one totalizer one step upon actuation of the units actuator of the other totalizer, and means for moving said first mentioned units actuator a variable number of steps upon various differential actuations of the tens actuator of said second mentioned totalizer.

15. In a machine of the class described, the combination of an actuator, a driving means for operating said actuator differentially, and key-operated means for moving said actuator with respect to said driving means and in the same direction as when moved by said driving means.

16. In a machine of the class described, the combination of an actuator, a driving means for said actuator, and positive means for moving said actuator away from said driving means and in the same direction as when moved by said driving means.

17. In a machine of the class described, the combination of an actuator, a driving means for said actuator, a key, and positive means driven by said key for moving said actuator away from said driving means and in the same direction as when moved by said driving means.

18. In a machine of the class described, the combination of a totalizer, a differentially movable actuator therefor, a plurality of keys, means for moving said actuator differentially under control of the keys, and means under control of certain of said keys for giving the actuator an additional movement.

19. In a machine of the class described, the combination of a totalizer wheel, an actuator therefor, a plurality of amount determining means, means for moving said actuator proportionately to a part of the amount represented by each of said amount determining means, and means for moving said actuator a constant extent for the remainder of the amount represented by said amount determining means.

20. In a machine of the class described, the combination of a totalizer wheel, an actuator therefor, amount keys, means for moving said actuator proportionately to a part of the amount represented by each key, and means for moving said actuator an additional constant amount upon actuation of any one of said keys.

21. In a machine of the class described, the combination of a totalizer wheel, an actuator therefor, a key, and a plurality of graduated members operated by said key for moving said actuator.

22. In a machine of the class described, the combination of a totalizer wheel, an actuator therefor, a key, graduated members operated by said key, and means for transmitting movement from said members to said actuator.

23. In a machine of the class described, the combination with a totalizer wheel; and an actuator therefor; of an actuator-operating element; means to releasably connect the actuator to its actuator-operating element; manipulative amount-determining devices, certain of which directly control the actuator-operating element; and means controlled by another of said amount-determining devices to release the actuator from its actuator-operating element, and ·directly operate the actuator.

24. In a machine of the class described, the combination with a totalizer wheel; of an actuator therefor; an actuator-operating element, the actuator adapted for limited travel relatively to its actuator-operating element; means to releasably connect the actuator and its actuator-operating element to prevent such relative movement; manipulative amount-determining devices, certain of which directly control the excursions of the actuator-operating element; and means controlled by another of said amount-determining devices, to release the actuator from its actuator-operating element, and to directly operate the actuator.

25. In a machine of the class described, the combination with a totalizer wheel; of an actuator therefor; an actuator-operating element, the actuator adapted to have a limited travel relatively to its operating element; means to releasably connect the actuator-operating element with its actuator to hold the actuator against relative movement; manipulative means, certain of which control the excursions of the actuator-operating element; and means including an oscillatory arm controlled by another of the manipulative devices to disconnect the actuator from its operating element, and to operate the actuator.

26. In a machine of the class described, the combination with a totalizer wheel; of an actuator therefor; an actuator-operating element, the actuator adapted to have a limited travel relatively to its operating element; means to releasably connect the actuator-operating element with its actuator to hold the actuator against relative movement; manipulative means, certain of which control the excursions of the actuator-operating element; a rocking arm; a release element controlled by the arm to disconnect the actuator from its operating element, and to directly operate the actuator; and means controlled by other of said manipulative devices to actuate the rocking arm.

27. In a machine of the class described, the combination with a totalizer wheel; of an actuator to turn the wheel in additive direction; a driving means for the actuator, the actuator adapted to be shifted relatively to its driving means; and means to shift the actuator in additive direction with respect to said driving means.

28. In a machine of the class described, the combination with a totalizer wheel; of an actuator to turn the wheel in additive direction; a driving means for the actuator, the actuator adapted to be shifted relatively to its driving means; and means to positively shift the actuator in additive direction away from said driving means.

29. In a machine of the class described, the combination with a totalizer wheel; of an actuator to turn the wheel in additive direction; a driving means for the actuator, the actuator adapted to be shifted relatively to its driving means; a key, and means positively driven by said key to positively shift the actuator in additive direction away from its driving means.

In testimony whereof I affix my signature.

EDWARD J. VON PEIN.

CERTIFICATE OF CORRECTION.

Patent No. 1,691,416.            Granted November 13, 1928, to

EDWARD J. VON PEIN.

It is hereby certified that error appears in the printed specification of the above numbered patent requiring correction as follows: Page 4, after line 105, "In following the description of the "Tax" totalizer it should be kept in mind that this invention is embodied in a standard type machine, referred to herein as shown in the Carney and Cleal patents, with the various parts arranged so as to keep as many parts as possible in their regular relative positions."

and that the said Letters Patent should be read with this correction therein that the same may conform to the record of the case in the Patent Office.
Signed and sealed this 19th day of February, A. D. 1929.

(Seal)                            M. J. Moore,
                                      Acting Commissioner of Patents.